United States Patent
Kamata et al.

(10) Patent No.: US 7,343,665 B2
(45) Date of Patent: Mar. 18, 2008

(54) METHOD OF MAKING CURRENT-PERPENDICULAR-TO-THE-PLANE STRUCTURE MAGNETORESISTIVE HEAD

(75) Inventors: Chikayoshi Kamata, Kawasaki (JP); Shin Eguchi, Kawasaki (JP); Atsushi Tanaka, Kawasaki (JP); Tooru Fukuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 10/281,826

(22) Filed: Oct. 28, 2002

(65) Prior Publication Data
US 2003/0145453 A1 Aug. 7, 2003

(30) Foreign Application Priority Data
Feb. 4, 2002 (JP) .............................. 2002-026403

(51) Int. Cl.
*G11B 5/187* (2006.01)
*B05D 1/32* (2006.01)

(52) U.S. Cl. ................ 29/603.14; 29/603.07; 29/603.13; 29/603.12; 216/22; 427/128; 427/282

(58) Field of Classification Search ............. 29/603.07, 29/603.13, 603.14, 603.12, 603.15, 603.16, 29/603.18, DIG. 16; 216/22, 41, 58; 360/313, 360/322, 320, 325; 427/128, 131, 97.1, 97.3, 427/98.4, 282
See application file for complete search history.

(56) References Cited

U.S. PATENT DOCUMENTS

| | | | | |
|---|---|---|---|---|
| 5,358,907 A | * | 10/1994 | Wong ..................... | 427/97.3 X |
| 5,491,600 A | * | 2/1996 | Chen et al. .............. | 360/322 X |
| 5,843,521 A | * | 12/1998 | Ju et al. .................. | 427/282 X |
| 5,992,004 A | * | 11/1999 | Sato et al. ............... | 29/603.14 |
| 7,130,162 B2 | | 10/2006 | Seyama et al. | |
| 2006/0272146 A1 | | 12/2006 | Seyama et al. | |

FOREIGN PATENT DOCUMENTS

| | | | |
|---|---|---|---|
| JP | 59-195887 | * 11/1984 | ............... 216/22 X |
| JP | 11-120758 | 4/1999 | |
| JP | 2000-277523 | 10/2000 | |
| JP | 2001-237469 | 8/2001 | |

* cited by examiner

*Primary Examiner*—A. Dexter Tugbang
(74) *Attorney, Agent, or Firm*—Greer, Burns & Crain, Ltd.

(57) ABSTRACT

The lower electrode is at least exposed at the surface of a substructure layer in a current-perpendicular-to-the-plane structure magnetoresistive element. A resist is formed to extend over the surface of the substructure layer. A patterning void is defined in the resist. The shape of the patterning void is designed to correspond to the contour of the magnetoresistive multilayered film. The magnetoresistive multilayered film is formed by deposition within the patterning void. This method enables avoidance of a dry etching process effected on the magnetoresistive multilayered film. Scrapings or waste of the magnetoresistive multilayered film are not generated at all. The side surfaces of the magnetoresistive multilayered film are completely prevented from attachment or adhesion of scrapings or waste. The side surfaces of the magnetoresistive multilayered film are kept stainless.

14 Claims, 8 Drawing Sheets

METHOD OF MAKING CURRENT-PERPENDICULAR-TO-THE-PLANE STRUCTURE MAGNETORESISTIVE HEAD

BACKGROUND OF THE INVENTION

1. Field of the Invention

The present invention relates to a method of making a magnetoresistive (MR) element utilizing a magnetoresistive multilayered film such as a tunnel-junction film, a spin valve film, or the like. In particular, the invention relates to a method of making a current-perpendicular-to-the-plane (CPP) structure magnetoresistive element in which a sensing electric current is allowed to penetrate through the magnetoresistive multilayered film in a perpendicular direction. The perpendicular direction is defined as a direction normal to the plane along which the magnetoresistive multilayered film extends.

2. Description of the Prior Art

In general, when a magnetoresistive element is to be made, a magnetoresistive (MR) multilayered film such as a so-called spin valve film, a tunnel-junction film, or the like is subjected to a dry etching process, for example. A resist film of a predetermined pattern is formed over the MR multilayered film in the dry etching process. When the dry etching process is effected, the MR multilayered film is removed over an area off the resist film. In this manner, the MR multilayered film is shaped into a predetermined contour.

The MR multilayered film is formed on the lower electrode in a so-called current-perpendicular-to-the-plane (CPP) structure magnetoresistive element. The upper electrode is formed on the MR multilayered film. When the upper electrode is to be formed, a so-called contact hole is formed in an insulation layer covering over the MR multilayered film. The upper electrode is allowed to contact the MR multilayered film through the contact hole.

A Au layer is formed to extend over the upper surface of the MR multilayered film in the CPP structure magnetoresistive element, for example. The Au layer exhibits a higher corrosion resistance to the etching gas during formation of the contact hole. The Au layer serves to protect the MR multilayered film from the etching gas during the etching process. The MR multilayered film can thus reliably be prevented from damages caused by the etching gas.

On the other hand, when the MR multilayered film is shaped into a predetermined shape as described above, the Au layer is subjected to a dry etching process. Scrapings or waste of the Au layer tends to adhere to the side surface of the MR multilayered film. The scrapings serve to establish an additional path for an electric current between the upper and lower electrodes. The sensing electric current may flow into the additional path around the MR multilayered film. A sufficient electric current cannot flow across the MR multilayered film, so that the magnetoresistive characteristic of the MR multilayered film gets deteriorated.

SUMMARY OF THE INVENTION

It is accordingly an object of the present invention to provide a method of making a current-perpendicular-to-the-plane (CPP) structure magnetoresistive element for reliably establishing a superior magnetoresistive characteristic of a magnetoresistive multilayered film.

According to a first aspect of the present invention, there is provided a method of making a current-perpendicular-to-the-plane structure magnetoresistive element, comprising: forming a substructure layer exposing at least partly a lower electrode; defining a patterning void standing on a surface of the substructure layer by using a resist formed on the surface of the substructure layer; and forming a magnetoresistive multilayered film on the lower electrode within the patterning void.

The aforementioned method enables avoidance of a dry etching process effected on the magnetoresistive multilayered film. Scrapings or waste of the magnetoresistive multilayered film are not generated at all. The side surfaces of the magnetoresistive multilayered film are completely prevented from attachment or adhesion of scrapings or waste. The side surfaces of the magnetoresistive multilayered film are kept stainless.

Preferably, the opening of the patterning void has the area larger than the bottom of the patterning void in the aforementioned method. The patterning void of this type serves to help the material of the magnetoresistive multilayered film to reliably reach the corners within the patterning void when the material of the magnetoresistive multilayered film is deposited within the patterning void. The complete magnetoresistive multilayered film is reliably established within the patterning void. In particular, when sputtering is employed to deposit the magnetoresistive multilayered film, the thickness of the individual layers can thus be controlled at a higher accuracy within the patterning void.

The method may further comprise: forming an electrically-conductive layer over a surface of the magnetoresistive multilayered film; forming an insulating film over the electrically-conductive layer; and forming a contact hole in the insulating film based on an etching process so as to expose a surface of the electrically-conductive layer.

Even this particular method enables avoidance of a dry etching process effected on the uppermost layer or electrically-conductive layer of the magnetoresistive multilayered film. Scrapings or waste of the electrically-conductive layer are not generated at all. The side surfaces of the magnetoresistive multilayered film can completely be covered with the insulating film. A CPP structure magnetoresistive element made in accordance with the mentioned method allows a sensing electric current to reliably penetrate through the magnetoresistive multilayered film. The magnetoresistive multilayered film exhibits a sufficient magnetoresistive characteristic.

For example, the insulating film may be made of any insulating material such as $Al_2O_3$, $SiO_2$, or the like. In this case, the electrically-conductive layer is only required to have a corrosion resistance to an etching gas employed in the etching process. The electrically-conductive layer may include at least one of Au, Pt and Ru. Au, Pt and Ru are well known to have a higher corrosion resistance to an etching gas such as $SF_6$, for example.

According to a second aspect of the present invention, there is provided a method of making a current-perpendicular-to-the-plane structure magnetoresistive element, comprising: forming a resist defining a patterning void standing from a surface of a substructure layer; and forming a magnetoresistive multilayered film within the patterning void.

The aforementioned method enables avoidance of a dry etching process effected on the magnetoresistive multilayered film. Scrapings or waste of the magnetoresistive multilayered film are not generated at all. The side surfaces of the magnetoresistive multilayered film are completely prevented from attachment or adhesion of scrapings or waste. In the same manner as described above, the side surfaces of the magnetoresistive multilayered film are kept stainless. In particular, the opening of the patterning void has the area larger than the bottom of the patterning void in the method. The patterning void of this type serves to help the material of the magnetoresistive multilayered film to reliably reach the corners within the patterning void when the material of the magnetoresistive multilayered film is deposited within the patterning void.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
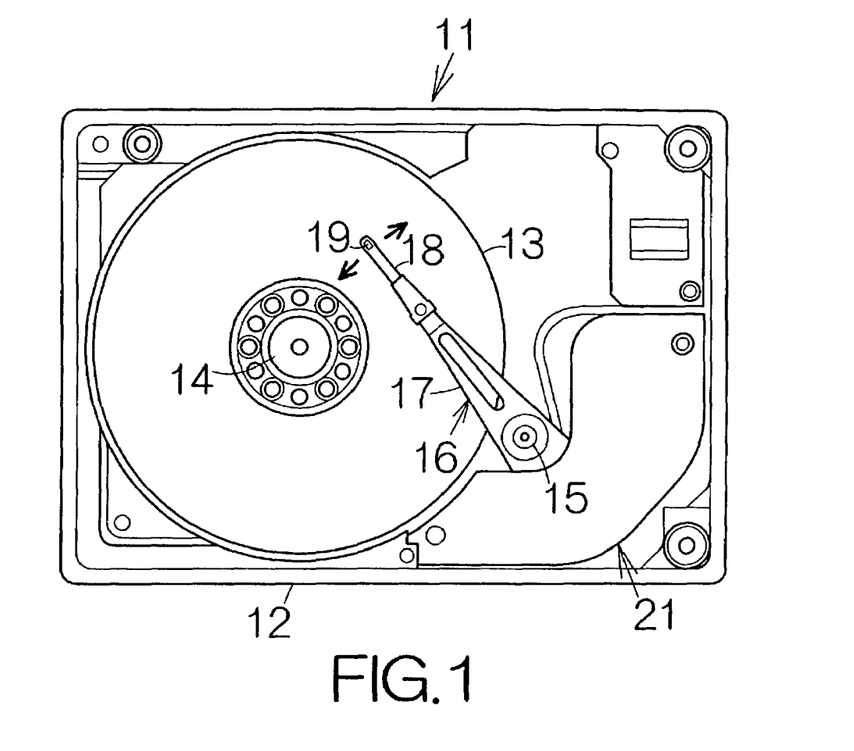
FIG. 1 is a plan view schematically illustrating the interior structure of a hard disk drive (HDD)

FIG. 1 schematically illustrates the interior structure of a hard disk drive (HDD) 11 as an example of a magnetic recording medium drive or storage device. The HDD 11 includes a box-shaped primary enclosure 12 defining an inner space of a flat parallelepiped, for example. At least one recording medium or magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution rate such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the tip end of the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive an airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
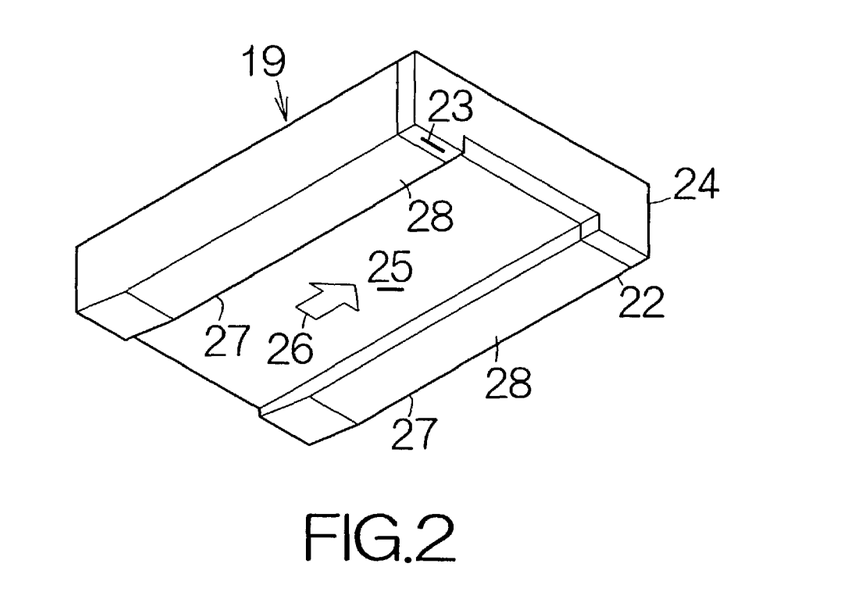
FIG. 2 is an enlarged perspective view schematically illustrating the structure of a flying head slider according to a specific example.

FIG. 2 illustrates a specific example of the flying head slider 19. The flying head slider 19 of this type includes a slider body 22 made of $Al_2O_3$-TiC in the form of a flat parallelepiped, and a head protection layer 24 formed to spread over the trailing or outflow end of the slider body 22. The head protection layer 24 may be made of $Al_2O_3$. A read/write electromagnetic transducer 23 is embedded in the head protection layer 24. A medium-opposed surface or bottom surface 25 is defined continuously over the slider body 22 and the head protection layer 24 so as to face the surface of the magnetic recording disk 13 at a distance. The bottom surface 25 is designed to receive an airflow 26 generated along the surface of the rotating magnetic recording disk 13.

A pair of rails 27 are formed to extend over the bottom surface 25 from the leading or inflow end toward the trailing or outflow end. The individual rail 27 is designed to define an air bearing surface (ABS) 28 at its top surface. In particular, the airflow 26 generates the aforementioned lift at the respective air bearing surfaces 28. The read/write electromagnetic transducer 23 embedded in the head protection layer 24 is exposed at the air bearing surface 28 as described later in detail. In this case, a diamond-like-carbon (DLC) protection layer may be formed over the air bearing surface 28 so as to cover over the exposed end of the read/write electromagnetic transducer 23. The flying head slider 19 may take any shape or form other than the above-described one.

Figure 3:
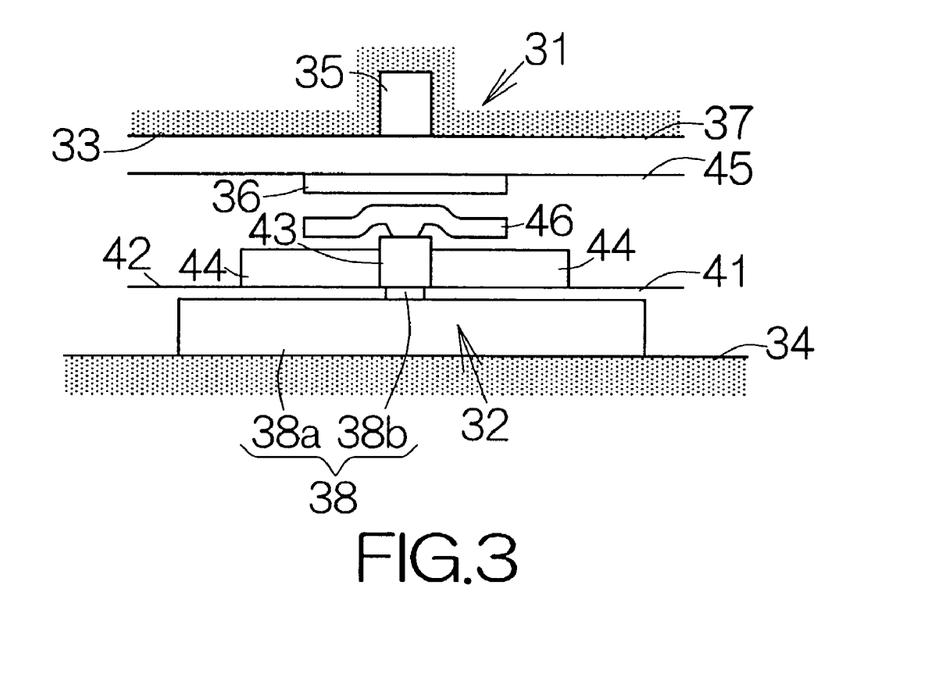
FIG. 3 is a front view schematically illustrating a read/write electromagnetic transducer observed at an air bearing surface of the flying head slider.

FIG. 3 illustrates an enlarged detailed view of the read/write electromagnetic transducer 23 exposed at the bottom surface 25. The read/write electromagnetic transducer 23 comprises an inductive write element or a thin film magnetic head 31 and a current-perpendicular-to-the-plane (CPP) structure electromagnetic transducer element or CPP structure magnetoresistive (MR) read element 32. The thin film magnetic head 31 is designed to write a magnetic bit data onto the magnetic recording disk 13 by utilizing a magnetic field induced in a conductive swirly coil pattern, not shown, for example. The CPP structure MR read element 32 is designed to detect a magnetic bit data by utilizing variation in the electric resistance in response to the inversion of the magnetic polarity in a magnetic field acting from the magnetic recording disk 13. The thin film magnetic head 31 and the CPP structure MR read element 32 are interposed between an $Al_2O_3$ (alumina) layer 33 as an upper half layer or overcoat film and an $Al_2O_3$ (alumina) layer 34 as a lower half layer or undercoat film. The overcoat and undercoat films in combination establish the aforementioned head protection layer 24.

The thin film magnetic head 31 includes an upper magnetic pole layer 35 exposing the front end at the air bearing surface 28, and a lower magnetic pole layer 36 likewise exposing the front end at the air bearing surface 28. The upper and lower magnetic pole layers 35, 36 may be made of FeN, NiFe, or the like, for example. The combination of the upper and lower magnetic pole layers 35, 36 establishes the magnetic core of the thin film magnetic head 31.

A non-magnetic gap layer 37 is interposed between the upper and lower magnetic pole layers 35, 36. The non-magnetic gap layer 37 may be made of $Al_2O_3$ (alumina), for example. When a magnetic field is induced at the conductive swirly coil pattern, a magnetic flux is exchanged between the upper and lower magnetic pole layers 35, 36. The non-magnetic gap layer 37 allows the exchanged magnetic flux to leak out of the air bearing surface 28. The thus leaked magnetic flux forms a magnetic field for recordation, namely, a write gap magnetic field.

The CPP structure MR read element 32 includes a lower electrode 38 spreading over the upper surface of the alumina layer 34 as a basement insulation layer. The lower electrode 38 is designed to comprise an electrically-conductive lead layer 38a and an electrically-conductive terminal piece 38b standing on the upper surface of the lead layer 38a. The lower electrode 38 may have not only a property of electric conductors but also a soft magnetic property. If the lower electrode 38 is made of a soft magnetic electric conductor, such as NiFe, for example, the lower electrode 38 is also allowed to serve as a lower shield layer for the CPP structure MR read element 32.

The lower electrode 38 is embedded in an insulation layer 41 spreading over the surface of the alumina layer 34. The insulation layer 41 is designed to extend over the surface of the lead layer 38a so as to contact the side surface of the terminal piece 38b. Here, the combination of the terminal piece 38b and the insulation layer 41 represents a substructure layer of the present invention. A flat surface 42 can be defined continuously on the substructure layer over the top surface of the terminal piece 38b and the upper surface of the insulation layer 41.

An electromagnetic transducer film or magnetoresistive (MR) multilayered film 43 is located on the flat surface 42 so as to extend along the air bearing surface 28. The MR multilayered film 43 is designed to extend at least across the top surface of the terminal piece 38b. In this manner, an electric connection can be established between the MR multilayered film 43 and the lower electrode 38. The structure of the MR multilayered film 43 will be described later in detail.

Likewise, a pair of biasing hard magnetic stripe layers, namely, domain control stripe layers 44, are located on the flat surface 42 so as to extend along the air bearing surface 28. The domain control stripe layers 44 are designed to interpose the MR multilayered film 43 along the air bearing surface 28 over the flat surface 42. The domain control stripe layers 44 may be made of a metallic material such as CoPt, CoCrPt, or the like. A specific magnetization is established in the domain control stripe layers 44 along a predetermined lateral direction across the MR multilayered film 43. The magnetization in the domain control stripe layers 44 in this manner serves to form a biasing magnetic field between the domain control stripe layers 44. The biasing magnetic field is designed to realize the single domain property in a free ferromagnetic layer, for example, in the MR multilayered film 43.

The flat surface 42 is covered with an overlaid insulation layer 45. The overlaid insulation layer 45 is designed to hold the MR multilayered film 43 and the domain control stripe layers 44 against the insulation layer 41. An upper electrode 46 is allowed to spread over the upper surface of the overlaid insulation layer 45. In the same manner as the lower electrode 38, the upper electrode 46 may have not only a property of electric conductors but also a soft magnetic property. If the upper electrode 46 is made of a soft magnetic electric conductor, such as NiFe, for example, the upper electrode 46 is also allowed to serve as an upper shield layer for the CPP structure MR read element 32. The space defined between the aforementioned lower shield layer or the lower electrode 38 and the upper electrode 46 determines the linear resolution of the magnetic recordation or data along the recording tracks on the magnetic recording disk 13. The upper electrode 46 comprises a terminal bump 47 penetrating through the overlaid insulation layer 45 so as to contact the upper surface of the MR multilayered film 43, as clearly shown in FIG. 4. In this manner, an electric connection can be established between the MR multilayered film 43 and the upper electrode 46.

A sensing electric current can be supplied to the MR multilayered film 43 through the upper and lower electrodes 46, 38 in the CPP structure MR read element 32. As is apparent from FIG. 3, the terminal piece 38b as well as the terminal bump 47 serves to reduce the path for the supplied sensing electric current in the MR multilayered film 43. Moreover, the CPP structure MR read element 32 of this type is allowed to establish the path of the sensing electric current at the central area of the MR multilayered film 43 remote from the contact to the domain control stripe layers 44.

Figure 4:
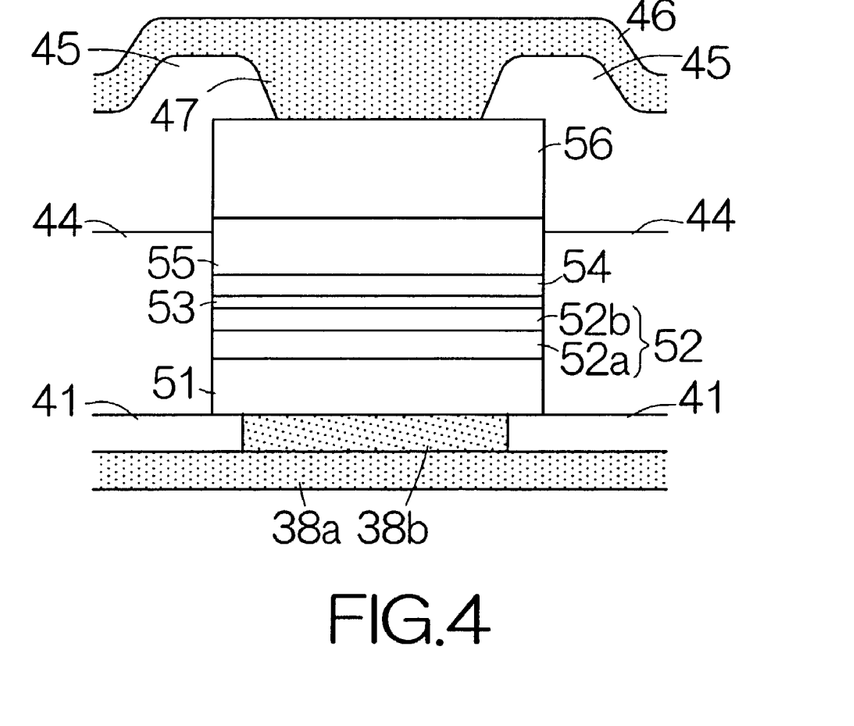
FIG. 4 is an enlarged front view schematically illustrating the structure of a tunnel-junction film according to a specific example of a magnetoresistive (MR) multilayered film.

FIG. 4 illustrates the MR multilayered film 43 according to a specific example. The MR multilayered film 43 is a so-called tunnel-junction film. Specifically, the MR multilayered film 43 includes a Ta basement layer 51, a free ferromagnetic layer 52, an insulating spacer layer 53, a pinned ferromagnetic layer 54, a pinning layer or an antiferromagnetic layer 55, and an electrically-conductive cap layer 56, spreading over the flat surface 42 in this sequence. The magnetization of the pinned ferromagnetic layer 54 is fixed in a specific lateral direction under the influence of the antiferromagnetic layer 55. The free ferromagnetic layer 52 may comprise a NiFe layer 52a spreading over the upper surface of the Ta basement layer 51, and a CoFe layer 52b superposed over the upper surface of the NiFe layer 52a, for example. The insulating spacer layer 53 may be made of $Al_2O_3$. The pinned ferromagnetic layer 54 may be made of a ferromagnetic material such as CoFe. The antiferromagnetic layer 55 may be formed of an antiferromagnetic material such as IrMn, PdPtMn, and the like. The electrically-conductive cap layer 56 may include a Au layer and a Pt layer, for example.

When the CPP structure MR read element 32 is opposed to the surface of the magnetic recording disk 13 for reading a magnetic information data, the magnetization of the free ferromagnetic layer 52 is allowed to rotate in the tunnel-junction film in response to the inversion of the magnetic polarity applied from the magnetic recording disk 13. The rotation of the magnetization in the free ferromagnetic layer 52 induces variation in the electric resistance of the tunnel-junction film. When a sensing electric current is supplied to the tunnel-junction film through the upper and lower electrodes 46, 38, a variation in the level of any parameter such as voltage appears, in response to the variation in the magnetoresistance, in the sensing electric current output from the upper and lower electrodes 46, 38. The variation in the level can be utilized to detect a magnetic bit data recorded on the magnetic recording disk 13.

Figure 5:
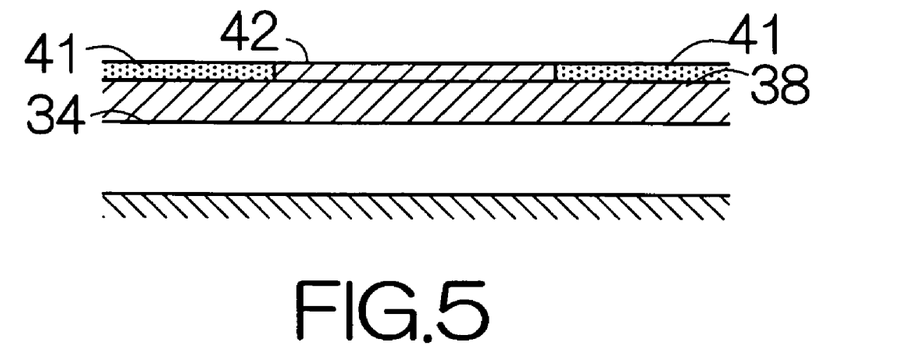
FIG. 5 is an enlarged partial vertical sectional view of a wafer schematically illustrating the process of forming a substructure layer.

Next, description will be made on a method of making the CPP structure MR read element 32. A wafer, not shown, made of $Al_2O_3$-TiC is first prepared. The overall surface of the wafer is covered with the alumina layer 34. As is apparent from FIG. 5, the lower electrode 38 is formed over the surface of the alumina layer 34. The lower electrode 38 is then embedded within the insulation layer 41 spreading over the surface of the alumina layer 34. When the insulation layer 41 is subjected to a flattening polishing treatment, for example, the terminal piece 38b of the lower electrode 38 is allowed to get exposed at the flat surface 42. In this manner, a substructure layer is formed to expose at least partly the lower electrode 38.

Figure 6:
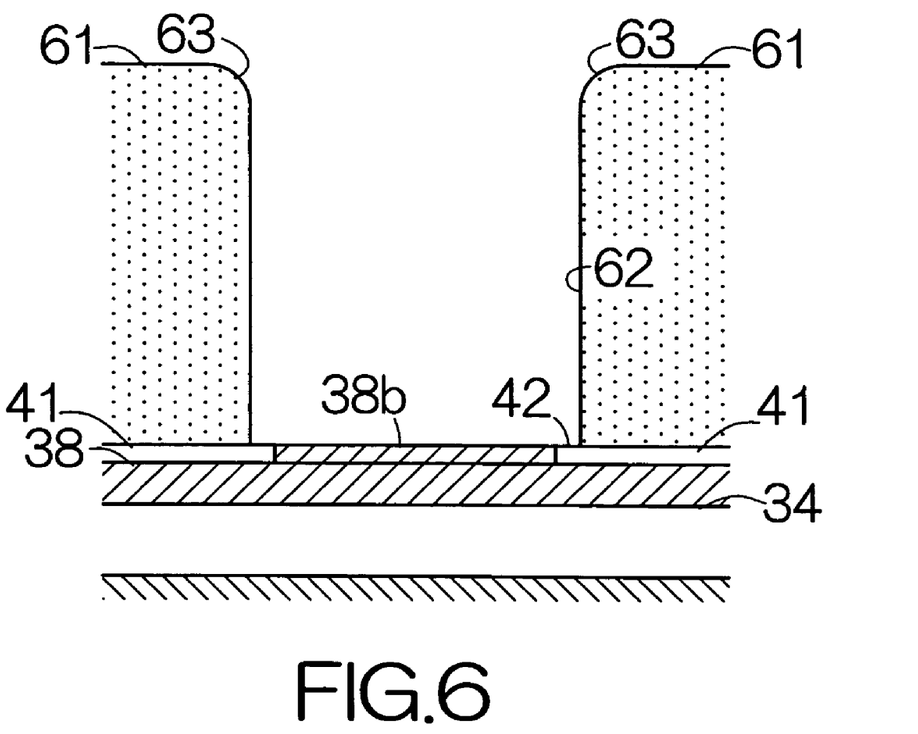
FIG. 6 is an enlarged partial vertical sectional view of the wafer schematically illustrating a photoresist film defining a patterning void corresponding to the shape of the MR multilayered film.

As shown in FIG. 6, a photoresist film 61 is then formed to extend over the upper surface of the substructure layer, namely, over the flat surface 42. A patterning void 62 is defined in the photoresist film 61. The patterning void 62 is designed to stand from the flat surface 42. The top surface of the terminal piece 38b of the lower electrode 38 gets exposed at the bottom of the patterning void 62. The patterning void 62 is prepared to have a shape corresponding to the contour of the MR multilayered film 43. An I-line stepper may be employed to pattern the patterning void 62.

Preferably, the opening of the patterning void 62 should have an area larger than the bottom of the patterning void 62. Specifically, the opening of the patterning void 62 is relatively enlarged. The patterning void 62 of this type can be obtained by subjecting the photoresist film 61 after exposure to a heat treatment prior to development. If the photoresist film 61 after exposure is subjected to a mild heat treatment, the edge of the photoresist film 61 gets chamfered. A chamfered edge 63 can be obtained around the opening of the patterning void 62 as is apparent from FIG. 6. The chamfered edge 63 serves to enlarge the area of the opening of the patterning void 62. Any other method or means may be employed to enlarge the opening of the patterning void 62. Otherwise, the patterning void 62 may be tapered continuously toward the bottom.

Figure 7:
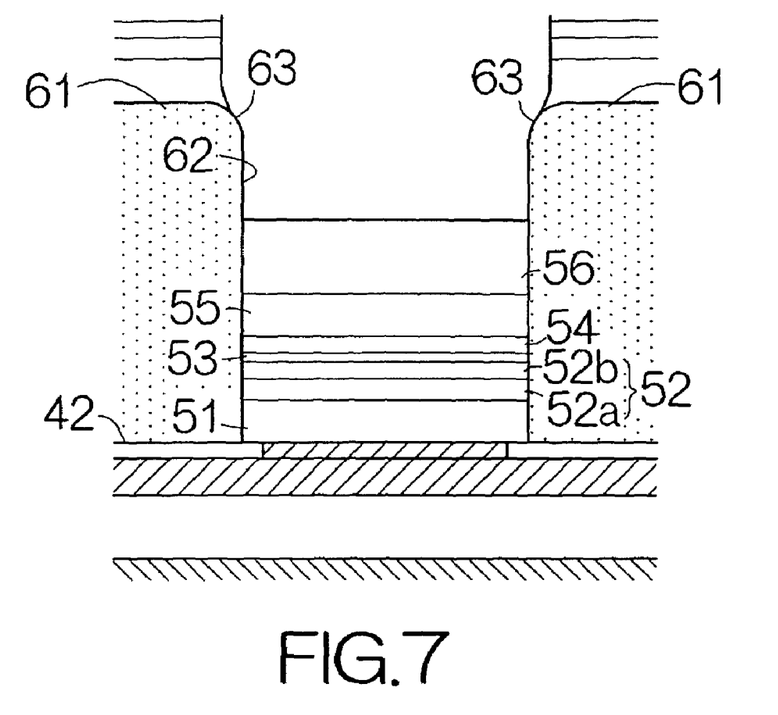
FIG. 7 is an enlarged partial vertical sectional view of the wafer schematically illustrating the process of depositing the MR multilayered film.

As shown in FIG. 7, the MR multilayered film 43 is thereafter formed within the patterning void 62. For example, the Ta layer 51, the NiFe layer 52a, the CoFe layer 52b, the $Al_2O_3$ layer 53, the CoFe layer 54, the IrMn layer 55, the Au layer 56 are sequentially deposited within the patterning void 62. Sputtering may be employed to form the multilayered structure in this manner. In particular, since the patterning void 62 has an enlarged opening as described above, sputtered particles are allowed to easily reach the corners within the patterning void 62. The thickness of the individual layers can thus be controlled at a higher accuracy within the patterning void 62.

Figure 8:
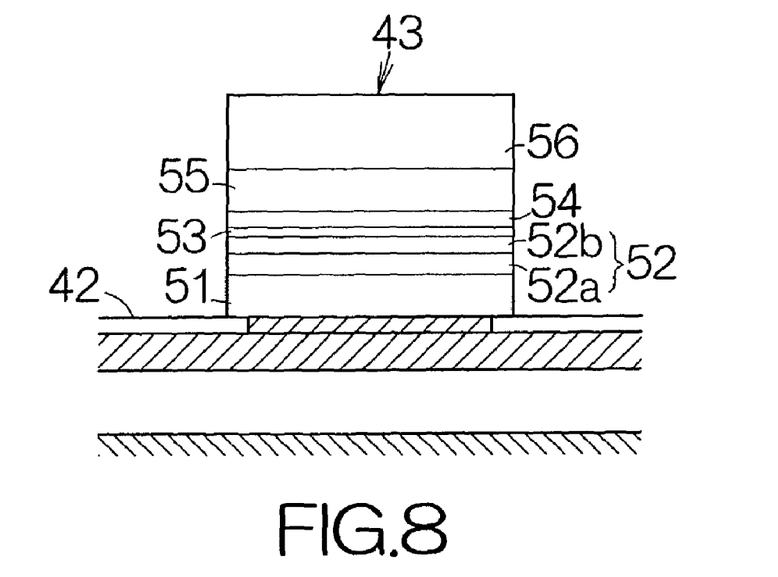
FIG. 8 is an enlarged partial vertical sectional view of the wafer schematically illustrating the MR multilayered film formed on the wafer.

When the MR multilayered film 43 has been established in the aforementioned manner, a so-called lift-off process is applied. Specifically, the photoresist film 61 is removed around the MR multilayered film 43. As a result, it is possible to obtain the MR multilayered film 43 standing from the upper surface of the substructure layer or flat surface 42, as shown in FIG. 8.

Figure 9:
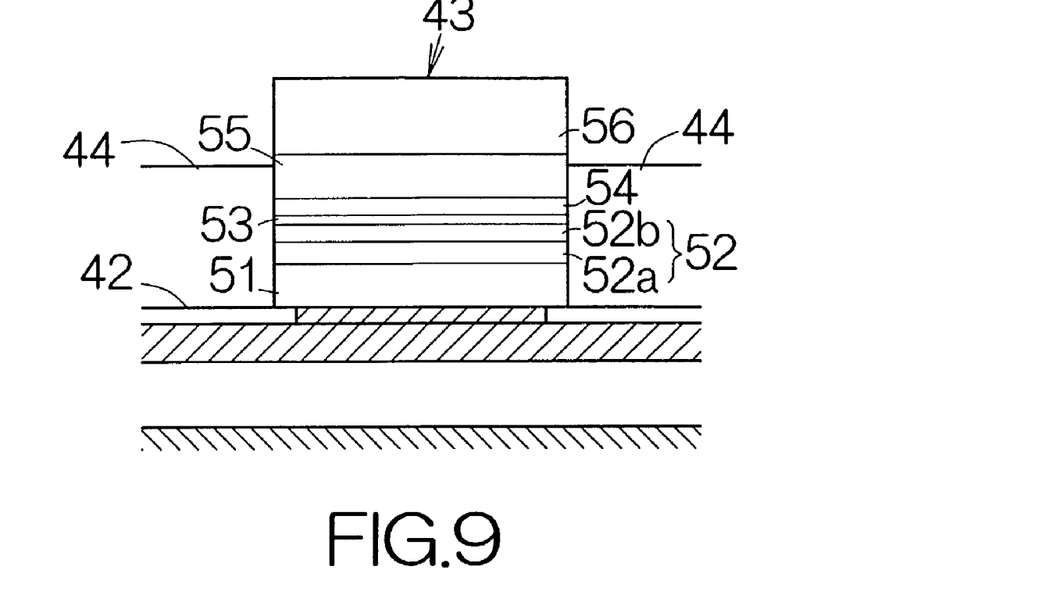
FIG. 9 is an enlarged partial vertical sectional view of the wafer schematically illustrating the process of forming domain control stripe layers.

Subsequently, the domain control stripe layers 44 are formed on the flat surface 42, as shown in FIG. 9. Sputtering may be employed, for example. A photoresist film, not shown, is previously formed to extend over the flat surface 42. The photoresist film serves to define spaces or voids, adjacent the MR multilayered film 43, corresponding to the contours of the domain control stripe layers 44. The domain control stripe layers 44 are formed within the voids, respectively. In this case, the domain control stripe layers 44 are only required to interpose the free ferromagnetic layer 52 of the MR multilayered film 43. Preferably, the top surfaces of the domain control stripe layers 44 remain below the level of the electrically-conductive cap layer 56 or Au layer.

Figure 10:
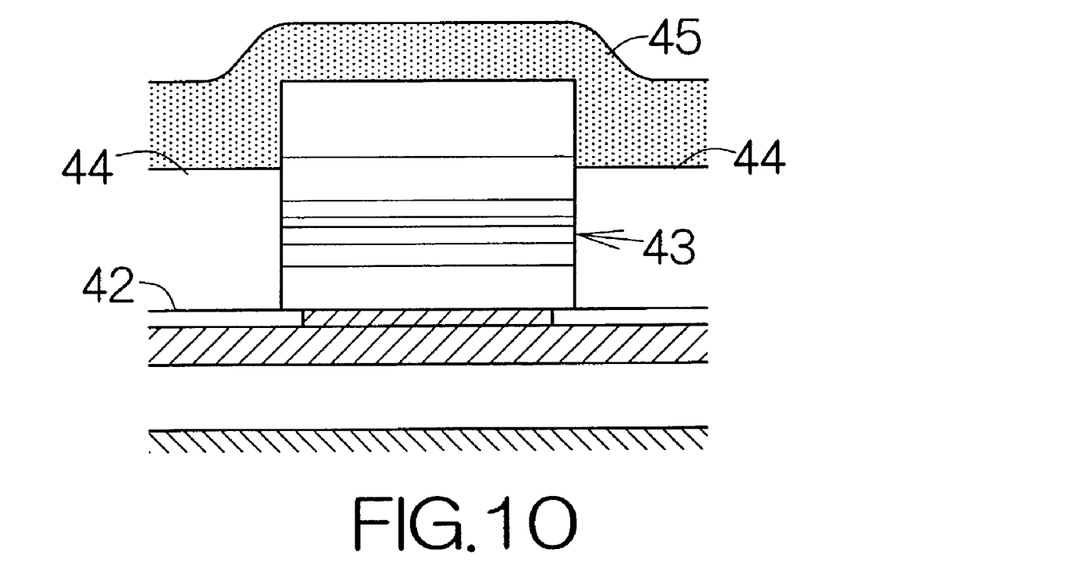
FIG. 10 is an enlarged partial vertical sectional view of the wafer schematically illustrating the process of forming an overlaid insulation layer.
Figure 11:
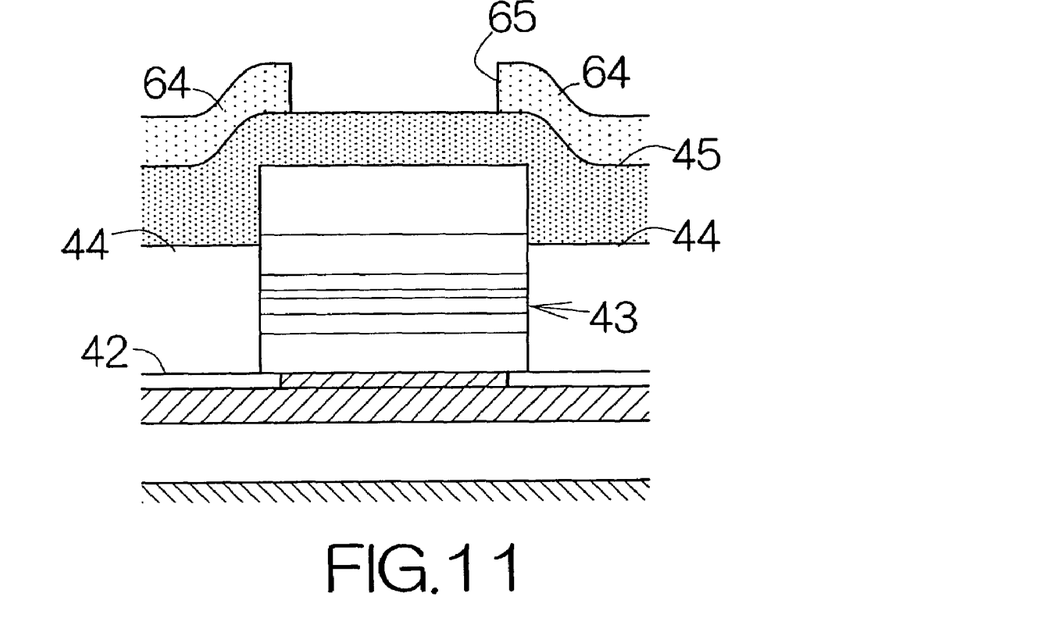
FIG. 11 is an enlarged partial vertical sectional view of the wafer schematically illustrating a photoresist film defining a void corresponding to the shape of a terminal bump provided on an upper electrode.

Thereafter, the overlaid insulation layer 45 is formed to extend all over the flat surface 42, as shown in FIG. 10. The MR multilayered film 43 as well as the domain control stripe layers 44 are covered with the overlaid insulation layer 45. Sputtering may be employed to form the overlaid insulation layer 45, for example. A target of an insulating material such as $SiO_2$, $Al_2O_3$, or the like may be utilized in the sputtering. As shown in FIG. 11, a photoresist film 64 is then formed to extend over the upper surface of the overlaid insulation layer 45. The photoresist film 64 serves to define a void 65 corresponding to the contour of the terminal bump 47 of the upper electrode 46.

Figure 12:
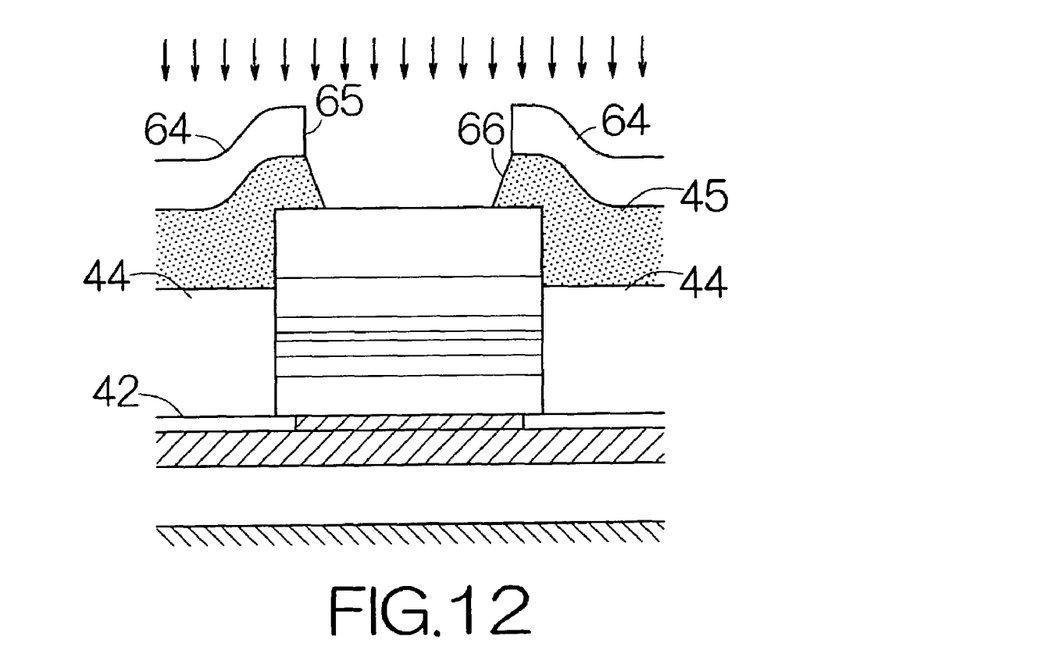
FIG. 12 is an enlarged partial vertical sectional view of the wafer schematically illustrating the process of forming a contact hole in the overlaid insulation layer.

The overlaid insulation layer 45 covered with the photoresist film 64 is then subjected to a reactive ion etching (RIE) process. An etching gas of $SF_6$ may be utilized in the etching process, for example. As shown in FIG. 12, the etching gas serves to remove the overlaid insulation layer 45 within the void 65. A so-called contact hole 66 can be formed in the overlaid insulation layer 45 in this manner. At this time, the electrically-conductive cap layer 56 or Au layer gets exposed at the bottom of the contact hole 66. Since the Au layer has a property of a higher corrosion resistance to the etching gas, the Au layer is reliably prevented from getting removed. The MR multilayered film 43 under the Au layer can be protected from the etching gas in this manner. The MR multilayered film 43 is reliably prevented from being damaged based on exposure to the etching gas. The photoresist film 64 may be removed after the contact hole 66 has been established.

Figure 13:
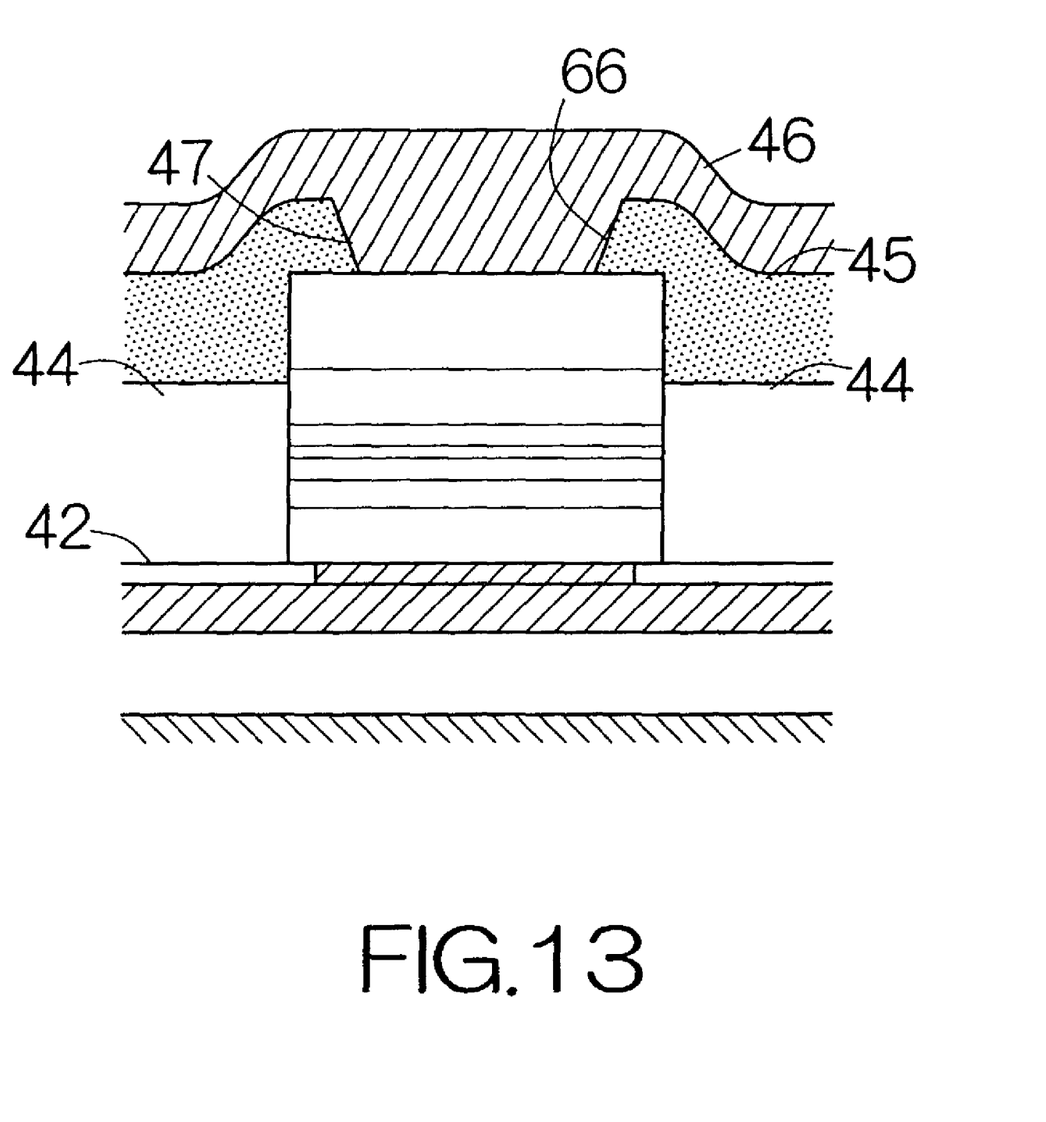
FIG. 13 is an enlarged partial vertical sectional view of the wafer schematically illustrating the process of forming the upper electrode.

As shown in FIG. 13, the upper electrode 46 is then formed to extend over the overlaid insulation layer 45. The upper electrode 46 enters the contact hole 66 so as to contact the upper surface of the MR multilayered film 43, namely, the electrically-conductive cap layer 56. In this manner, the making of the CPP structure MR read element 32 has been completed. As conventionally known, the thin film magnetic head 31 is formed over the established CPP structure MR read element 32.

The above-described method allows avoidance of any dry etching process to be effected on the MR multilayered film 43. In particular, the electrically-conductive cap layer 56 or Au layer on the MR multilayered film 43 is prevented from exposure to dry etching gases. Scrapings or waste of the Au layer are not generated at all. The side surfaces of the MR multilayered film 43 are completely covered with the insulation layer. The CPP structure MR read element 32 produced in accordance with the above-described method allows a sensing electric current to reliably penetrate through the MR multilayered film 43. The MR multilayered film 43 exhibits a sufficient magnetoresistive characteristic.

The present inventors have observed the magnetoresistive characteristic of the MR multilayered film 43 established in accordance with the aforementioned method. The present inventors have prepared the MR multilayered film 43 on a wafer made of $Al_2O_3$-TiC. As described above, a photoresist film was formed on the lower electrode to define the patterning void. A Ta layer of 10.0 nm thickness, a NiFe layer of 2.0 nm thickness, a CoFe layer of 3.0 nm thickness, an $Al_2O_3$ layer of 1.0 nm thickness, a CoFe layer of 3.0 nm thickness, an IrMn layer of 10.0 nm thickness and a Au layer of 20.0 nm thickness were deposited in this sequence within the patterning void. The upper electrode was then formed to extend over the overlaid insulation layer after the contact hole has been defined.

Likewise, the present inventors have prepared a comparative example of an MR multilayered film. The MR multilayered film of the comparative example was scraped out of a multilayered material on a wafer based on a dry etching process in a conventional manner. The multilayered material included a Ta layer of 10.0 nm thickness, a NiFe layer of 2.0 nm thickness, a CoFe layer of 3.0 nm thickness, an $Al_2O_3$ layer of 1.0 nm thickness, a CoFe layer of 3.0 nm thickness, an IrMn layer of 10.0 nm thickness and a Au layer of 20.0 nm thickness. A photoresist film having the shape and contour identical to that of the aforementioned patterning void was formed on the surface of the multilayered material prior to the dry etching process. The multilayered material was removed over an area off the photoresist film.

Figure 14:
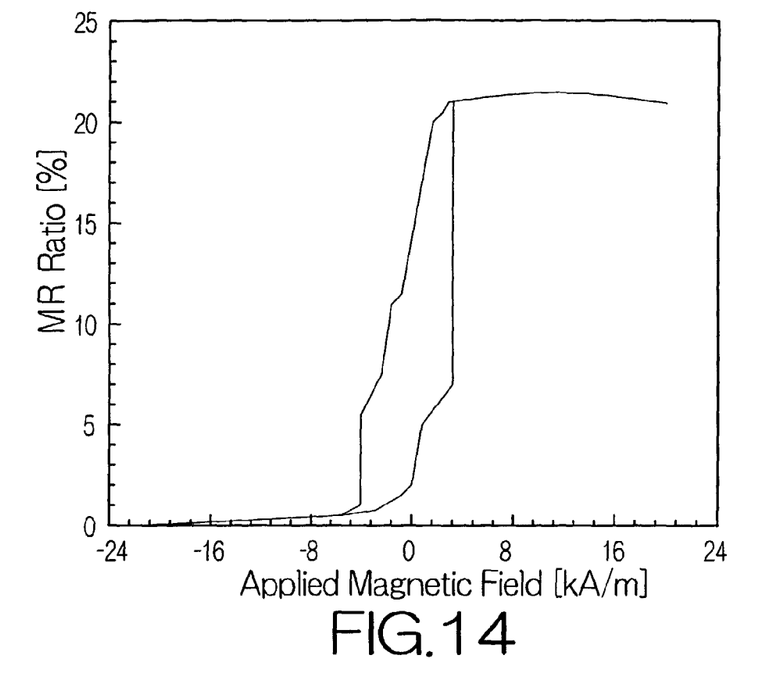
FIG. 14 is a graph illustrating the magnetoresistive characteristic of an MR multilayered film according to a specific example of the embodiment.
Figure 15:
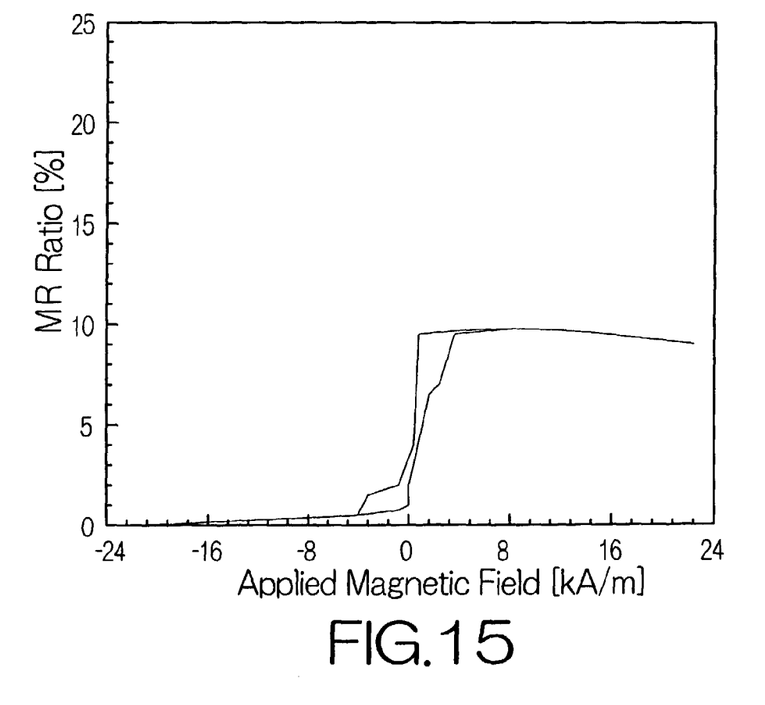
FIG. 15 is a graph illustrating the magnetoresistive characteristic of an MR multilayered film of a comparative example.

As is apparent from FIG. 14, it has been confirmed that the MR multilayered film 43 deposited within the patterning void exhibits a superior magnetoresistive characteristic. To the contrary, the MR multilayered film of the comparative example only exhibited the MR ratio of 10% at the maximum. A sufficient magnetoresistive characteristic could not be obtained in the MR multilayered film of the comparative example as compared with the MR multilayered film 43 according to the embodiment.

What is claimed is:

1. A method of making a current-perpendicular-to-the-plane structure magnetoresistive element, comprising:
    forming a substructure layer exposing at least partly a lower electrode;
    defining a patterning void standing on a surface of the substructure layer by using a resist formed directly on the surface of the substructure layer; and
    successively forming a free ferromagnetic layer, a spacer layer, a pinned ferromagnetic layer, and one of a pinning laying and an antiferromagnetic layer within the patterning void so that a magnetoresistive multilayered film is formed on the lower electrode within the patterning void.

2. The method according to claim 1, wherein an opening of the patterning void has an area larger than a bottom surface of the patterning void.

3. The method according to claim 2, further comprising:
    forming an electrically-conductive layer over a surface of the magnetoresistive multilayered film;
    forming an insulating film over the electrically-conductive layer; and
    forming a contact hole in the insulating film based on an etching process so as to expose a surface of the electrically-conductive layer.

4. The method according to claim 3, wherein said electrically-conductive layer has a corrosion resistance to an etching gas employed in the etching process.

5. The method according to claim 4, wherein said electrically-conductive layer includes at least one of Au, Pt and Ru.

6. The method according to claim 5, wherein said insulating film is any one of $Al_2O_3$ and $SiO_2$.

7. The method according to claim 1, wherein a flat surface is defined continuously on the surface of the substructure and an exposure surface of the lower electrode.

8. The method according to claim 1, wherein the spacer layer is an insulating spacer layer.

9. The method according to claim 1, wherein the resist forms a photoresist film, and
    the patterning void is defined in the photoresist film.

10. The method according to claim 1, wherein an electric connection is established between the magnetoresistive multilayered film and the lower electrode.

11. A method of making a current-perpendicular-to-the-plane structure magnetoresistive element, comprising:
    forming a substructure layer exposing at least partly a lower electrode;
    defining a patterning void standing on a surface of the substructure layer by using a resist formed directly on the surface of the substructure layer;
    forming a magnetoresistive multilayered film on the lower electrode within the patterning void;
    forming an electrically-conductive layer over a surface of the magnetoresistive multilayered film;
    forming an insulating film over the electrically-conductive layer; and
    forming a contact hole in the insulating film based on an etching process so as to expose a surface of the electrically-conductive layer.

12. The method according to claim 11, wherein said electrically-conductive layer has a corrosion resistance to an etching gas employed in the etching process.

13. The method according to claim 12, wherein said electrically-conductive layer includes at least one of Au, Pt and Ru.

14. The method according to claim 13, wherein said insulating film is any one of $Al_2O_3$ and $SiO_2$.

* * * * *